United States Patent [19]
Neal et al.

[11] Patent Number: 6,048,938
[45] Date of Patent: Apr. 11, 2000

[54] PROCESS FOR PRODUCING CREPED PAPER PRODUCTS AND CREPING AID FOR USE THEREWITH

[75] Inventors: Charles William Neal; Lois Jean Forde-Kohler, both of Cincinnati; Donald Arthur Salsman, West Chester, all of Ohio

[73] Assignee: The Procter & Gamble Company, Cincinnati, Ohio

[21] Appl. No.: 09/283,074

[22] Filed: Mar. 31, 1999

Related U.S. Application Data

[62] Division of application No. 08/996,392, Dec. 22, 1997, Pat. No. 5,942,085.

[51] Int. Cl.$^7$ ...................................................... C08L 77/00
[52] U.S. Cl. ........................... 525/185; 524/503; 524/386; 524/388
[58] Field of Search ..................... 524/503, 386, 524/388; 525/187, 185

[56] References Cited

U.S. PATENT DOCUMENTS

| | | | |
|---|---|---|---|
| 3,926,716 | 12/1975 | Bates | 162/113 |
| 4,063,995 | 12/1977 | Grossman | 162/112 |
| 4,064,213 | 12/1977 | Lazorisak et al. | 264/134 |
| 4,191,609 | 3/1980 | Trokhan | 162/113 |
| 4,300,981 | 11/1981 | Carstens | 162/109 |
| 4,304,625 | 12/1981 | Grube et al. | 162/111 |
| 4,308,092 | 12/1981 | Latimer et al. | 162/111 |
| 4,406,737 | 9/1983 | Latimer et al. | 162/111 |
| 4,436,867 | 3/1984 | Pomplun et al. | 524/503 |
| 4,440,597 | 4/1984 | Wells et al. | 162/111 |
| 4,448,638 | 5/1984 | Klowak | 162/112 |
| 4,482,429 | 11/1984 | Klowak | 162/111 |
| 4,501,640 | 2/1985 | Soerens | 162/111 |
| 4,514,345 | 4/1985 | Johnson et al. | 264/22 |
| 4,528,239 | 7/1985 | Trokhan | 428/247 |
| 4,528,316 | 7/1985 | Soerens | 524/503 |
| 4,529,480 | 7/1985 | Trokhan | 162/109 |
| 4,637,859 | 1/1987 | Trokhan | 162/109 |
| 4,684,439 | 8/1987 | Soerens | 162/111 |
| 4,788,243 | 11/1988 | Soerens | 524/503 |
| 4,883,564 | 11/1989 | Chen et al. | 162/112 |
| 4,886,579 | 12/1989 | Clark et al. | 162/111 |
| 4,919,756 | 4/1990 | Sawdai | 162/111 |
| 4,975,499 | 12/1990 | Bachem et al. | 525/430 |
| 4,981,557 | 1/1991 | Bjorkquist | 162/168.2 |
| 4,994,146 | 2/1991 | Soerens | 162/112 |
| 5,019,606 | 5/1991 | Marten et al. | 523/414 |
| 5,025,046 | 6/1991 | Soerens | 524/72 |
| 5,179,150 | 1/1993 | Furman, Jr. et al. | 524/376 |
| 5,187,219 | 2/1993 | Furman, Jr. | 524/377 |
| 5,221,435 | 6/1993 | Smith, Jr. | 162/164.1 |
| 5,234,547 | 8/1993 | Knight et al. | 162/111 |
| 5,245,025 | 9/1993 | Trokhan et al. | 536/56 |
| 5,246,544 | 9/1993 | Hollenberg et al. | 162/111 |
| 5,256,727 | 10/1993 | Dulany et al. | 524/608 |
| 5,275,700 | 1/1994 | Trokhan | 162/358.1 |
| 5,326,434 | 7/1994 | Carevic et al. | 162/111 |
| 5,328,565 | 7/1994 | Rasch et al. | 162/113 |
| 5,332,118 | 7/1994 | Muckenfuhs | 221/48 |
| 5,334,289 | 8/1994 | Trokhan et al. | 162/358.2 |
| 5,338,807 | 8/1994 | Epsy et al. | 525/430 |
| 5,354,829 | 10/1994 | Swisher et al. | 528/10 |
| 5,364,504 | 11/1994 | Smurkoski et al. | 162/116 |
| 5,370,773 | 12/1994 | Luu et al. | 162/111 |
| 5,374,334 | 12/1994 | Sommese et al. | 162/111 |
| 5,382,323 | 1/1995 | Furman, Jr. et al. | 162/111 |
| 5,468,796 | 11/1995 | Chen et al. | 524/377 |
| 5,490,903 | 2/1996 | Chen et al. | 162/111 |
| 5,492,599 | 2/1996 | Olson et al. | 162/137 |
| 5,494,554 | 2/1996 | Edwards et al. | 162/111 |
| 5,527,428 | 6/1996 | Trokhan et al. | 162/116 |
| 5,556,509 | 9/1996 | Trokhan et al. | 162/111 |
| 5,629,052 | 5/1997 | Trokhan et al. | 427/508 |
| 5,633,309 | 5/1997 | Warchol et al. | 524/538 |
| 5,637,194 | 6/1997 | Ampulski et al. | 162/109 |
| 5,660,687 | 8/1997 | Allen et al. | 162/111 |
| 5,786,429 | 7/1998 | Allen | 525/430 |
| 5,833,806 | 11/1998 | Allen | 162/111 |

FOREIGN PATENT DOCUMENTS

| | | | |
|---|---|---|---|
| 0 743 172 | 11/1996 | European Pat. Off. | B31F 1/12 |
| 0802215 | 10/1997 | European Pat. Off. | C08G 73/02 |
| 0814108 | 12/1997 | European Pat. Off. | C08G 73/02 |
| 2 179 953 | 3/1987 | United Kingdom | C09J 3/00 |
| WO 97/11223 | 3/1997 | WIPO | D21F 11/00 |
| WO 97/44526 | 11/1997 | WIPO | D21H 21/14 |

OTHER PUBLICATIONS

Oliver, John F., *Tappi Journal*, Dry–Creping of Tissue Paper—A Review of Basic Factors, Dec. 1980, vol. 63, No. 12, pp. 91–95.

Gary S. Furman and Winston Su, *Nordic Pulp Research Journal*, No. 1/1993 "A Review of Chemical and Physical Factors Influencing Yankee Dryer Coatings".

*Primary Examiner*—Robert Dawson
*Assistant Examiner*—Kuo-Liang Peng
*Attorney, Agent, or Firm*—Julie A. Glazer; Edward J. Milbrada; Larry L. Huston

[57] ABSTRACT

A method for producing creped paper products comprising applying to a drying surface, a film-forming semi-crystalline polymer and a non-thermosetting cationic resin containing no secondary amine. The invention also comprises a method for producing creped paper products comprising applying to a drying surface a film-forming semi-crystalline polymer, a non-thermosetting cationic resin containing no secondary amines and an optional plasticizer.

10 Claims, 1 Drawing Sheet

PROCESS FOR PRODUCING CREPED PAPER PRODUCTS AND CREPING AID FOR USE THEREWITH

This application is a division of Ser. No. 08/996,392 filed Dec. 22, 1997, now U.S. Pat. No. 5,942,085.

FIELD OF THE INVENTION

This invention relates to a new process for producing creped paper products which results in improved paper quality.

BACKGROUND OF THE INVENTION

Enhancing the softness of paper products such as tissue and towelling is desirable. Softness is the tactile sensation a user perceives as the user holds, rubs or crumples a particular paper product. This tactile sensation is provided by a combination of several physical properties including the bulk, stiffness and stretchability of the paper. Creping, a process which is well known in the art, is a means of mechanically foreshortening a fibrous structure in the machine direction in order to enhance the softness, bulk and stretchability of the paper. Creping is generally accomplished with a flexible blade, known as a creping blade, which is placed against a drying surface such as a Yankee dryer. The fibrous structure adheres to the Yankee dryer as it contacts the dryer surface. The web travels along the surface of the Yankee dryer until it is removed by the creping blade. The degree to which the fibrous structure adheres to the Yankee dryer prior to creping is a key factor in determining the degree of softness, bulk, and stretchability exhibited by the fibrous structure after creping.

The level of adhesion of the fibrous structure to the Yankee surface is also of importance as it relates to the control of the web in its travel from the creping blade to the reel of the paper machine. Fibrous structures which are insufficiently adhered to the surface of the Yankee dryer are generally difficult to control and often result in quality problems at the reel such as wrinkling, foldovers and weaved edges. Poorly formed paper affects the reliability of the entire papermaking process and subsequent converting operation.

The level of adhesion of the fibrous structure to the Yankee surface is also of importance as it relates to the drying of the web. Higher levels of adhesion permit better heat transfer. This enables the web to dry faster thus allowing the operation to run at higher speeds. Creping aids are generally applied to the surface of the Yankee dryer to further facilitate the adhesion/creping process. It is desirable to deposit the creping aid on the surface of the Yankee dryer.

It has been observed on paper machines utilizing through-air drying, that less creping aid tends to deposit on the dryer surface compared to paper machines utilizing conventional press sections. A through-air dried fibrous structure tends to be transferred to the Yankee dryer at a higher consistency than a fibrous structure which is conventionally wet pressed. Additionally, due to limited knuckle area, a web which is through-air dried, will have a smaller area of contact with the nip of the Yankee dryer pressure roll than a web which is conventionally wet pressed. Thus, through-air dried fibrous structures tend to have poorer adhesion than that of fibrous structures which are conventionally wet pressed.

Prior to the development of creping aids, adhesion of the fibrous structure to the dryer surface was accomplished through the presence of naturally occurring hemicellulose present in the paper fiber. Hemicellulose deposits were observed forming on the surface of the dryer as a result of the evaporation of water from the web. The hemicellulose deposits were found to contain small fiber fragments picked out of the fibrous structure. It was noted that these deposits resulted in the formation of a heavy film on the surface of the Yankee and subsequent poor crepe quality.

It is important that the creping aid allow for a proper balance between adhesion of the fibrous structure to the drying surface and the release of the web at the creping blade. Historically, one of the difficulties encountered with the use of creping aids has been a tendency for the creping aid to form a bond between the web and the drying surface at the point of creping such that the web does not properly release from the drying surface. This results in portions of the web remaining adhered to the surface thus causing defects in the web and/or causing the web to break.

Another common problem associated with the use of creping aids, is an excessive build-up of the creping aid on the drying surface. While some amount of buildup of the creping aid on the surface is essential, excessive buildup can produce streaks which impact the profile of adhesion across the width of the drying surface. This can result in bumps or wrinkles in the finished paper. Quite often, a second blade, known as a cleaning blade, is placed on the drying surface just after the creping blade. The purpose of the cleaning blade is to remove excess creping aid and other residue left behind. Historically, both the creping blade and cleaning blade have had to be frequently changed in order to prevent excessive buildup.

In order to prevent excessive buildup on the drying surface, it is important that the creping aid be rewettable. "Rewettable", as used herein, refers to the ability of the creping aid remaining on the Yankee dryer surface to be activated by the moisture contained in the fibrous structure. A marked increase in tack is indicative of high rewettability. Because through-air drying tends to remove more water than a conventional wet press section, a fibrous structure which is through-air dried will typically be transferred to the Yankee dryer at a higher consistency than a fibrous structure which is conventionally wet pressed. Because a through-air dried web contains less moisture than a similar web which is conventionally wet pressed, there is less moisture available in the through-air dried web to be transferred to the surface of the Yankee dryer. A fibrous structure which has been dried to a relatively higher fiber consistency, such as a through-air dried web, is more difficult to adhere to the drying surface because the web has less water available to rewet the creping aid at the point at which the fibrous structure is transferred to the drying surface.

U.S. Pat. No. 3,926,716, issued to Bates on Dec. 16, 1975 and incorporated herein by reference, teaches a polyvinyl alcohol creping adhesive which forms a film upon application to the surface of the Yankee dryer. It is believed that the polyvinyl alcohol exhibits a rewet mechanism wherein the film already on the surface of the Yankee dryer is rewetted as moisture is released from the fibrous structure at the pressure roll nip of the Yankee dryer.

With the advent of the addition of wet strength resins to the wet end of the paper machine based on polyamide polyamine epichlorohydrin (PAA) wherein the amine is a secondary amine, it was observed that adhesion of the web to the Yankee dryer surface improved. This led to the development of creping aids based on similar PAA secondary amine resin chemistry as that used for wet strength resins. PAA secondary amine based creping aids have had wide acceptance in those paper machine systems using a conventional wet press section. However, in those paper machine systems utilizing through-air drying, creping aids based on PAA secondary amine chemistry have not enjoyed the same success.

This stems from the fact that creping aids based on PAA secondary amine resin chemistry are thermosetting and thus will cure on the heated surface of the Yankee dryer. Creping aids containing thermosetting resins are problematic in that the coating formed by the application of the creping aid to the Yankee dryer on a machine utilizing through-air drying tends to be brittle and exhibits poor adhesion to the dryer surface.

Another problem stems from the wet end addition of wet strength resins which are thermosetting. The thermosetting wet strength resins will actively crosslink with creping aids which contain a secondary amine backbone resulting in the formation of a hard coating on the surface of the Yankee dryer with poor adhesive properties thereby reducing the overall efficacy of the creping aid.

U.S. Pat. No. 4,501,640, issued to Soerens on Feb. 26, 1985, purports to teach a method for creping a cellulosic web wherein an admixture of polyvinyl alcohol and a water-soluble thermosetting cationic polyamide resin are applied to a creping cylinder.

U.S. Pat. No. 5,187,219, issued to Furman, Jr. on Feb. 16, 1993 purports to teach a creping adhesive composition comprising a thermosetting water soluble acrylamide polymer having glyoxal-reacted amide substituents and unsubstituted amide groups and a method of applying the composition.

U.S. Pat. No. 5,494,554, issued to Edwards et al. on Feb. 27, 1996, purports to teach the application of a creping adhesive comprising a thermosetting cationic polyamide resin and a plasticizer to the surface of a dryer.

All of these teachings suffer from a common drawback in that as each of the purported creping aids contains a thermosetting resin. The thermosetting resin will cure on the heated surface of the Yankee dryer forming a brittle coating with poor adhesion characteristics. Additionally, each of the purported creping aids contains secondary amines. The use of creping aids containing secondary amines in conjunction with the addition of a thermosetting wet strength resin will tend to reduce the efficacy of the creping aid.

The objective of the present invention is to provide a method of producing a creped paper product exhibiting overall improved crepe quality.

Another objective of the present invention is to provide a creping aid which exhibits overall improved performance in conjunction with all types of fibrous structures including those through-air dried fibrous structures transferred to the Yankee dryer at higher consistencies.

A further object of this invention is to provide a more efficient method for producing creped paper products wherein the creping aid is not deleteriously impacted by the use of thermosetting wet strength resins.

SUMMARY OF THE INVENTION

This invention comprises a method for making creped paper products. The process comprises five basic steps including:

a) providing a fibrous structure;

b) providing a drying surface;

c) applying a creping aid comprising a film-forming semi-crystalline polymer and a non-thermosetting cationic resin containing no secondary amines, the non-thermosetting cationic resin is derived from reacting the polyamides of a dicarboxylic acid and methyl bis(3-aminopropylamine) in aqueous solution with epichlorohydrin in a mole ratio of between about 1:0.1 and about 1:0.33;

d) applying a fibrous structure to the drying surface whereby the fibrous structure contacts the creping aid;

e) removing the fibrous structure from the drying surface.

The creping aid may be applied directly to the drying surface or it may be applied directly to that surface of the fibrous structure which contacts the drying surface. The creping aid may also be applied directly to the forming fabric or the foraminous carrier fabric. The drying surface may be heated. The fibrous structure can be removed from the drying surface by creping.

The film-forming semi-crystalline polymer of this invention is selected from the group consisting of hemicellulose, carboxymethyl cellulose and polyvinyl alcohol. If polyvinyl alcohol is selected it is preferred that it have a degree of hydrolysis of at least about 86%.

The non-thermosetting cationic resin has a viscosity at 25° C. of about 20 centipoise to 500 centipoise and a total solids content of about 12% to 30% based on the dry weight of the resin. The resin comprises from about 5% to 90% of the total creping aid based on the dry weight of the resin relative to the dry weight of the creping aid. The polyvinyl alcohol comprises from about 5% to 95% of the total creping aid based on the dry weight of the polyvinyl alcohol relative to the dry weight of the creping aid. The creping aid may be applied at a rate of about 0.25 to 7.0 pounds of dry weight of the total applied creping aid per ton of dry fiber produced at the reel of the paper machine.

The invention may also optionally include a plasticizer. The plasticizer may be selected from the group consisting of ethylene glycol, diethylene glycol, triethylene glycol, dipropylene glycol and glycerol. The plasticizer may comprise from about 0.5% to 90% of the creping aid based on the dry weight of the plasticizer relative to the dry weight of the creping aid.

The non-thermosetting cationic resin and the plasticizer may be applied together and the polyvinyl alcohol may be applied separately or the non-thermosetting cationic resin, the plasticizer and the polyvinyl alcohol may each be applied separately. The fibrous structure of this invention has a moisture content of between about 10% to 90% upon contact with the drying surface.

The invention also comprises a creping aid composition comprising a film-forming semi-crystalline polymer and a non-thermosetting cationic resin containing no secondary amines, wherein the non-thermosetting cationic resin is derived by reacting the polyamides of a dicarboxylic acid and methyl bis(3-aminopropyl)amine in aqueous solution with epichlorohydrin in a mole ratio of between about 1:0.1 and about 1:0.33. The creping aid composition may optionally also include a plasticizer wherein the plasticizer is selected from the group consisting of ethylene glycol, propylene glycol, diethylene glycol triethylene glycol, dipropylene glycol and glycerol.

DETAILED DESCRIPTION OF THE INVENTION

Figure 1:
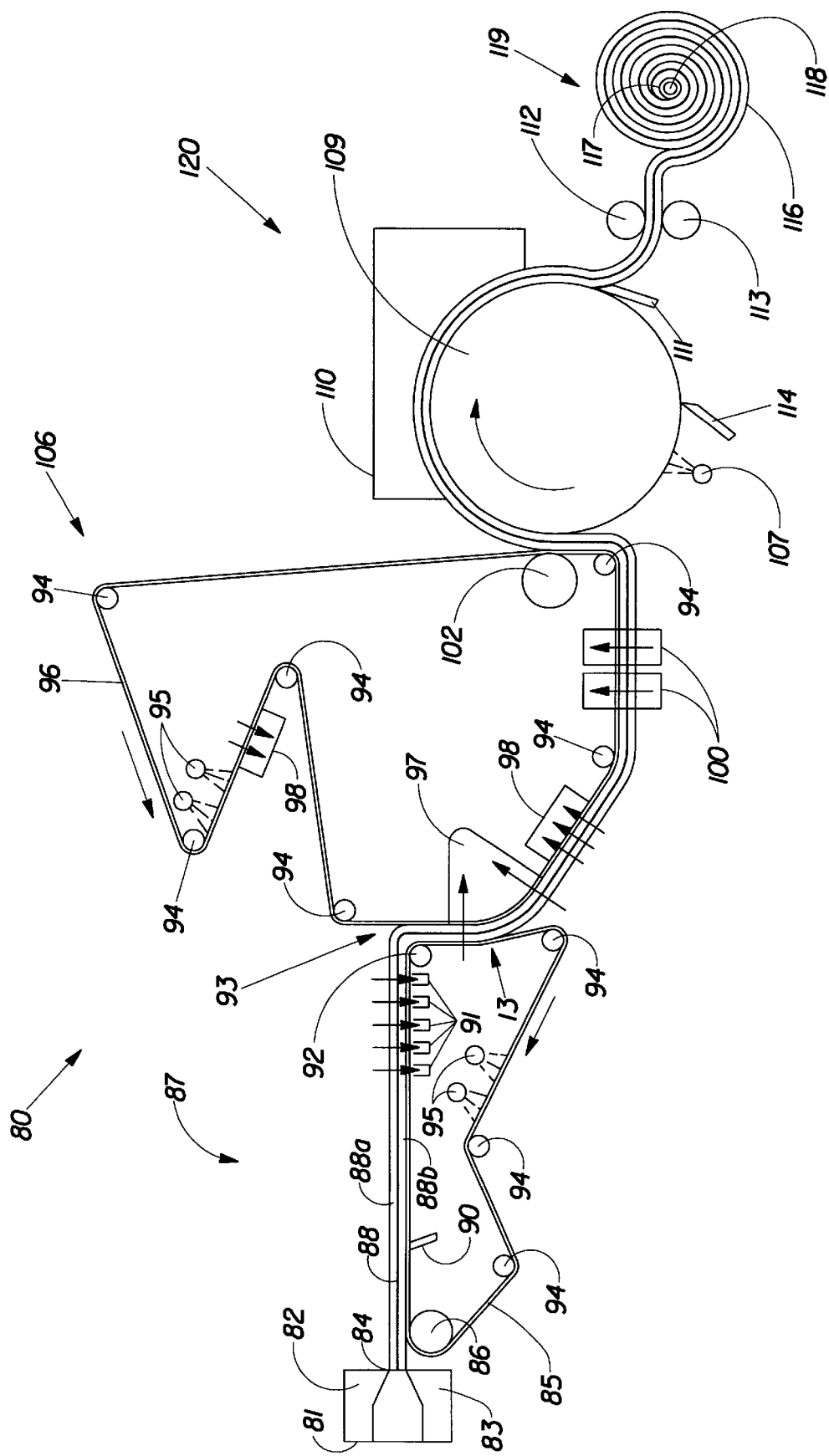
FIG. 1 is a schematic side elevational view of a preferred papermaking apparatus for use with this invention.

The present invention relates to a process for making creped paper products. There are five basic steps in this process including but not limited to:

a) providing a fibrous structure,
b) providing a drying surface;
c) applying a creping aid comprising a film-forming semi-crystalline polymer and a non-thermosetting cationic resin containing no secondary amines, the non-thermosetting cationic resin is derived from reacting the polyamides of a dicarboxylic acid and methyl bis(3-aminopropyl)amine in aqueous solution with epichlorohydrin in a mole ratio of between about 1:0.1 and about 1:0.33;
d) applying a fibrous structure to the drying surface whereby the fibrous structure contacts the creping aid:
e) removing the fibrous structure from the drying surface.

Providing a Fibrous Structure

Components of the Aqueous Papermaking Furnish Comprising the Fibrous Structure

As used herein, "fibrous structure" refers to a fibrous material which may be comprised of cellulosic and noncellulosic components. These cellulosic and noncellulosic components which include papermaking fibers and other various additives are mixed with water to form an aqueous slurry. It is this aqueous slurry which constitutes the aqueous papermaking furnish. It is anticipated that wood pulp in all its varieties will normally comprise the papermaking fibers used in this invention. However, other cellulose fibrous pulps, such as cotton linters, bagasse, rayon, etc., can be used and none are disclaimed. Wood pulps useful herein include chemical pulps such as, sulfite and sulfate (sometimes called kraft) pulps as well as mechanical pulps including for example, groundwood, thermomechanical pulp (TMP) and chemithermomechanical pulp (CTMP).

Both hardwood pulps and softwood pulps as well as combinations of the two may be employed as papermaking fibers for the present invention. The term "hardwood pulps" as used herein refers to fibrous pulp derived from the woody substance of deciduous trees (angiosperms), whereas "softwood pulps" are fibrous pulps derived from the woody substance of coniferous trees (gymnosperms). Pulps from both deciduous and coniferous trees can be used. Blends of hardwood kraft pulps, especially eucalyptus, and northern softwood kraft (NSK) pulps are particularly suitable for making the tissue webs of the present invention. Another preferred embodiment of the present invention comprises layered tissue webs wherein, most preferably, hardwood pulps such as eucalyptus are used for outer layer(s) and wherein northern softwood kraft pulps are used for the inner layer(s). Also applicable to the present invention are fibers derived from recycled paper, which may contain any or all of the above categories of fibers.

Additives such as particulate fillers, including clay, calcium carbonate, titanium dioxide, talc, aluminum silicate, calcium silicate, alumina trihydrate, activated carbon, pearl starch, calcium sulfate, glass microspheres, diatomaceous earth, and mixtures thereof can also be included in the aqueous papermaking furnish.

Other additives, of which the following are examples, can be added to the aqueous papermaking furnish or the fibrous structure to impart other characteristics to the paper product or improve the papermaking process so long as they do not interfere or counteract the advantages of the present invention.

It is sometimes useful, for purposes of retention and web strength to include starch as one of the ingredients of the papermaking furnish, especially cationic starch. Particularly suitable starches for this purpose are produced by National Starch and Chemical Company, (Bridgewater, N.J.) under the tradename. REDIBOND®.

It is common to add a cationic charge biasing species to the papermaking process to control the zeta potential of the aqueous papermaking furnish as it is delivered to the papermaking process. One suitable material is CYPRO 514®, a product of Cytec, Inc. of Stamford, Conn.

It is also common to add retention aids. Multivalent ions can be effectively added to the aqueous papermaking furnish in order to enhance the retention of fine particles which might otherwise remain suspended in the recirculating water system of the paper machine. The practice of adding alum, for example, has long been known. More recently, polymers which carry many charge sites along the chain length have been effectively employed for this purpose. Both anionic and cationic flocculants are expressly included within the scope of the present invention. Flocculants such as RETEN 235®, a product of Hercules, Inc. of Wilmington, Del. and ACCURAC 171®, a product of Cytec, Inc. of Stamford, Conn. are examples of anionic flocculants. Flocculants such as RETEN 157®, a product of Hercules, Inc. of Wilmington, Del., and ACCURAC 91®, a product of Cytec, Inc. of Stamford, Conn. are examples of acceptable cationic flocculants.

The use of high surface area, high anionic charge microparticles for the purposes of improving formation, drainage, strength, and retention is well known in the art. See, for example, U.S. Pat. No. 5,221,435, issued to Smith on Jun. 22, 1993, incorporated herein by reference. Common materials for this purpose are silica colloid, bentonite clay, or organic microparticles. The incorporation of such materials is expressly included within the scope of the present invention.

The above listings of chemical additives are intended to be merely exemplary in nature, and are not meant to limit the scope of the invention.

Preparation of the Fibrous structure

The fibrous structure of this invention may be made according to commonly assigned U.S. Pat. No. 3,926,716 issued to Bates on Dec. 16, 1975; U.S. Pat. No. 4,191,609 issued Mar. 4, 1980 to Trokhan; U.S. Pat. No. 4,300,981 issued to Carstens on Nov. 17, 1981; U.S. Pat. No. 4,191,609 issued to Trokhan on Mar. 4, 1980; U.S. Pat. No. 4,514,345 issued to Johnson et al. on Apr. 30, 1985; U.S. Pat. No. 4,528,239 issued to Trokhan on Jul. 9, 1985; U.S. Pat. No. 4,529,480 issued to Trokhan on Jul. 16, 1985; U.S. Pat. No. 4,637,859 issued to Trokhan on Jan. 20, 1987; U.S. Pat. No. 5,245,025 issued to Trokhan et al. on Sep. 14, 1993; U.S. Pat. No. 5,275,700 issued to Trokhan on Jan. 4, 1994; U.S. Pat. No. 5,328,565 issued to Rasch et al. on Jul. 12, 1994; U.S. Pat. No. 5,332,118 issued to Muckenfuhs on Jul. 26, 1994; U.S. Pat. No. 5,334,289 issued to Trokhan et al. on Aug. 2, 1994; U.S. Pat. No. 5,364,504 issued to Smurkowski et al. on Nov. 15, 1995; U.S. Pat. No. 5,527,428 issued to Trokhan et al. on Jun. 18, 1996; U.S. Pat. No. 5,556,509 issued to Trokhan et al. on Sep. 17, 1996; U.S. Pat. No. 5,628,876 issued to Ayers et al. on May 13, 1997; U.S. Pat. No. 5,629,052 issued to Trokhan et al. on May 13, 1997; and U.S. Pat. No. 5,637,194 issued to Ampulski et al. on Jun. 10, 1997, the disclosures of which are incorporated herein by reference for the purpose of showing how to make a fibrous structure suitable for use with the present invention.

The fibrous structure of the present invention may be conventionally wet pressed or preferably through-air dried. It may be foreshortened by creping or by wet microcontraction. Creping and wet microcontraction are disclosed in commonly assigned U.S. Pat. No. 4,440,597 issued to Wells et al. on Apr. 3, 1984 and U.S. Pat. No. 4,919,756 issued to Sawdai on May 4, 1980, the disclosures of which patents are incorporated herein by reference.

Referring to FIG. 1, the paper machine 80 comprises a headbox 81 and preferably a layering headbox having a top chamber 82, a bottom chamber 83, and a slice roof 84. The paper machine 80 has a forming section 87 encircled by a forming fabric 85. The forming fabric 85 is carried around the forming section 87 by the breast roll 86, a deflector 90, vacuum suction boxes 91, couch roll 92 and a plurality of turning rolls 94. Prior to making a full rotation around the forming section 87, the forming fabric 85 is cleaned by the cleaning showers 95 as it makes its return run in the direction shown by the arrow.

A web transfer zone 93 separates the forming section 87 from the pre-drying section 106 of the paper machine 80. A foraminous carrier fabric 96 encircles the pre-drying section 106. As the foraminous carrier fabric 96 loops around the pre-drying section 106, it passes over a vacuum dewatering box 98, passes through the through-air dryers 100 and continues on past a turning roll 94 and a pressure roll 102. The foraminous carrier fabric 96 is cleaned and dewatered as it completes its loop by passing over and around additional turning rolls 94, cleaning showers 95 and another vacuum dewatering box 98.

Providing a Drying Surface

The drying section 120 is next in the papermaking apparatus after the pre-drying section 106. The drying section 120 is comprised of a drying surface. The drying surface may be at ambient temperature or it may be heated. Any drying surface is suitable, however, a Yankee dryer 109 is preferable. The Yankee dryer 109 is generally steam heated. A drying hood 110 which circulates hot air by a means not shown may be positioned over the Yankee dryer 109 in an effort to further facilitate the drying operation. In the preferred embodiment, at least one creping aid spray boom shower 107 is juxtaposed with the Yankee dryer 109. A creping blade 111 is positioned against the surface of the Yankee dryer 109 so as to create an impact angle between the blade and the surface of the dryer wherein the impact angle ranges from about 70° to 90° and preferably from about 80° to 85°. An optional cleaning blade 114 may be utilized to remove contaminant buildup and excess coating from the surface of the Yankee dryer 109.

Applying a Creping Aid

The creping aid of this invention may be applied directly to the fibrous structure 88. Preferably the creping aid is applied to the surface of the fibrous structure 88 which directly contacts the drying surface. The creping aid may also be applied in the forming section 87 of the paper machine 80 such as to the forming fabric 85. Preferably, the creping aid is applied to the surface of the forming fabric 85 which directly contacts the fibrous structure 88. The creping aid may also be applied in the pre-drying section 106 to the foraminous carrier fabric 96. Preferably the creping aid is applied to the surface of the foraminous carrier fabric 96 which directly contacts the fibrous structure 88. Most preferably, the creping aid is applied directly to the drying surface such as to the surface of the Yankee dryer 109.

The creping aid of this invention comprises a film-forming semi-crystalline polymer and a non-thermosetting cationic resin containing no secondary amines. Suitable film-forming semi-crystalline polymers include hemicellulose, carboxymethyl cellulose and preferably polyvinyl alcohol. Polyvinyl alcohols having a degree of hydrolysis of about 86% or more are preferred. A suitable polyvinyl alcohol is AIRVOL 425 commercially available from Air Products and Chemical Inc. of Allentown, Pa.

The non-thermosetting cationic resin of this invention may be made according to U.S. Pat. No. 5,338,807 issued to Espy et al. on Aug. 16, 1994 and incorporated herein by reference. The non-thermosetting cationic resin is synthesized by directly reacting the polyamides of a dicarboxylic acid and methyl bis(3-aminopropyl)amine in aqueous solution, with epichlorohydrin, using a mole ratio between about 1:0.1 and about 1:0.33, and preferably a mole ratio between about 1:0.2 and about 1:0.3. The dicarboxylic acids can include saturated and unsaturated dicarboxylic acids having from about 2 to 12 carbon atoms, including by way of example, oxalic, malonic, succinic, glutaric, adipic, pilemic, suberic, azelaic, sebacic, maleic, fumaric, itaconic, phthalic, isophthalic and terephthalic acids. Adipic and glutaric acids are preferred, with adipic acid being the most preferred. The esters of the aliphatic dicarboxylic acids, and aromatic dicarboxylic acids, such as the phathalic acid, may be used, as well as combinations of such dicarboxylic acids or esters.

The intrinsic viscosity of the precursor polyamide at 25° C. may range from 0.090–0.225 dl/g with a preferred range being 0.10 dl/g to 0.20 dl/g. The finished resin is preferably diluted with water to a solution containing 12.0% to 30.0% total solids, with 24% to 26% total solids being preferred. The Brookfield viscosity range at 25° C. is from about 20 cps to about 500 cps as measured at a total solids content of 25%, with a preferred viscosity range of about 40 cps to 90 cps.

The general formula of the polyamide backbone and resin used in this invention are:

Polyamide:

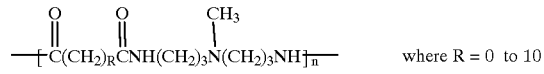

where R = 0 to 10

Resin:

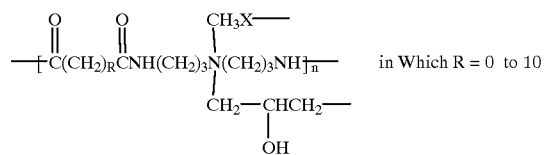

in Which R = 0 to 10

The critical aspect of this formulation is the absence of thermosetting properties due to the absence of an active crosslinking functional group and the absence of secondary amine groups which could further crosslink with thermosetting resins added in the wet end of the papermachine. Both criteria are required. A loss of adhesion is indicative of crosslinking with the available secondary amine groups. Upon continued exposure to a thermosetting resin containing azetidinium active functional groups in conjunction with the high temperature conditions found on a Yankee dryer 109, a non-thermosetting resin having secondary amine groups in the backbone structure would be expected to continue crosslinking, resulting in its brittleness and a loss of its adhesive properties. In contrast, the adhesive properties of the non-thermosetting cationic resin of this invention will not be negatively impacted by this type of continuous exposure. A non-thermosetting cationic resin containing no secondary amines suitable for use with this invention is sold as CREPETROL A 3025, commercially available from Hercules Incorporated of Wilmington, Del.

Optionally, the creping aid of this invention may also include a modifier. Modifiers are used to alter the adhesion/ creping characteristics of the coating formed on the surface of the Yankee dryer 109 resultant from the application of the creping aid to the Yankee dryer 109 surface. Suitable modifiers include hydrocarbon oils, surfactants, and preferably plasticizers.

Surfactants and hydrocarbon oils function primarily by increasing the lubricity of the coating formed on the drying surface thereby modifying the release characteristics of the coating. Surfactants and hydrocarbon oils tend not to be fully compatible with the other components of the creping aid. When added as a component of the creping aid, there is a tendency for the surfactant or hydrocarbon oil to separate out from the rest of the creping aid solution thereby forming a two phase creping aid solution which in turn decreases the overall efficacy of the creping aid.

Furthermore, this incompatibility will also negatively impact the quality of the coating formed on the drying surface. While not wishing to be constrained by theory, it is believed that both surfactants and oils will form an oil film at the interface of the coating and the fibrous structure 88 resulting in a loss of adhesion of the fibrous structure 88 to the surface of the Yankee dryer 109.

Conversely, a plasticizer tends to be fully compatible with the creping aid. The plasticizer of this invention, which forms a stable dispersion in water, is compatible with the other components of the creping aid of this invention. The plasticizer functions by reacting with the other components of the creping aid so as to soften the coating formed on the surface of the Yankee dryer 109. The plasticizer of this invention has a swelling ratio of at least 0.10 and a solubility parameter greater than 20 $MPA^{1/2}$. Suitable plasticizers include propylene glycol, diethylene glycol, triethylene glycol dipropylene glycol, glycerol, and preferably ethylene glycol. A preferred plasticizer, sold commercially as CREPETROL R 6390, is available from hercules Incorporated of Wilmington, Del.

The creping aid of this invention may be printed, blown, puddled or preferably sprayed onto the surface of the Yankee dryer 109 through the creping aid spray boom shower 107. The film-forming semi-crystalline polymer, the non-thermosetting cationic resin and the optional plasticizer may all be applied together to the surface of the Yankee dryer 109 or they may each be applied separately. Additionally, the non-thermosetting cationic resin and the plasticizer may be applied together while the polyvinyl alcohol is applied separately.

The non-thermosetting cationic resin of this invention has a total solids content range of about 12% to 30% based on the dry weight of the resin and comprises from about 5% to 90% of the creping aid based on the dry weight of the resin relative to the dry weight of the creping aid. The polyvinyl alcohol of this invention comprises from about 5% to 95% of the creping aid based on the dry weight of the polyvinyl alcohol relative to the dry weight of the creping aid. The optional plasticizer of this invention comprises from about 0.5% to 90% of the creping aid based on the dry weight of the plasticizer relative to the dry weight of the creping aid. The application rate of the creping aid is about 0.25 to 7.0 pounds of dry weight of the total applied creping aid per ton of dry fiber produced at the reel 119 of the paper machine 80.

In the preferred operation, a first aqueous papermaking furnish is pumped through a top chamber 82 and a second aqueous papermaking furnish is pumped through the bottom chamber 83. Each furnish is pumped out of the slice roof 84 onto the forming fabric 85 wherein the two furnishes combine to form a fibrous structure 88 comprising a first layer 88a and a second layer 88b. The fibrous structure 88 is dewatered on the forming fabric 85 assisted by the deflector 90 and vacuum suction boxes 91.

The fibrous structure 88 is then transferred to the pre-drying section 106. As the fibrous structure 88 enters the web transfer zone 93, it is transferred to the foraminous carrier fabric 96 by the action of the vacuum transfer box 97. The foraminous carrier fabric 96 carries the fibrous structure 88 from the transfer zone past the vacuum dewatering box 98 through the through-air dryers 100 and past a turning roll 94.

Applying the Fibrous Structure to the Drying Surface

The web is transferred from the foraminous carrier fabric 96 to the Yankee dryer 109 surface. At this point of transfer, the fibrous structure 88 has a consistency of about 10% to 90%, preferably 45% to 75%, and more preferably 55% to 65%. The web is secured to the surface of the Yankee dryer 109 by the pressure roll 102 assisted by the creping aid. The fibrous structure 88 is dried by the steam heated Yankee dryer 109 and by hot air which is circulated through a drying hood 110.

Removing the Fibrous Structure from the Drying Surface

The fibrous structure 88 is removed from the surface of the Yankee dryer 109 preferably by creping it from the surface with a creping blade 111. The fibrous structure 88 then passes between calender rolls 112 and 113 and is wound into a roll 116 on a core 117 disposed on a shaft 118.

The present invention is applicable to creped tissue paper in general and includes but is not limited to conventionally wet pressed creped tissue paper, high bulk pattern densified creped tissue paper and high bulk, uncompacted creped tissue paper.

EXAMPLE

A fibrous structure 88 was produced from pulp slurries comprising a first layer 88a and a second layer 88b. The first layer 88a and second layer 88b represented 40% and 60% respectively of the total fiber mix. The first layer 88a was comprised of a blend of 75% Northern Softwood Kraft (NSK) and 25% broke. The second layer 88b was comprised of 100% Eucalyptus. A wet strength resin KYMENE 557H, commercially available from Hercules Inc. of Wilmington, Del. was added in equal amounts to both the NSK and the Eucalyptus pulps with the total wet strength resin addition ranging from about 12 to 18 pounds of wet strength resin (based on dry weight of the wet strength resin) per ton of the dry weight of the fibrous structure 88 produced at the reel 119 of the paper machine 80. A proprietary chemical softener was added to the Eucalyptus pulp just prior to the paper machine 80 headbox 81 at an addition rate ranging from about 1 to 2 pounds of chemical softener (based on active chemical softener) per ton of dry weight of the fibrous structure 88 produced at the reel 119 of the paper machine 80. Carboxymethyl cellulose (CMC), sold as CMC '7MCT, and commercially available from Hercules Inc. of Wilmington, Del., was added to the NSK at an addition rate ranging from about 3 to 4 pounds of CMC (based on the dry weight of CMC) per ton of dry weight of the fibrous structure 88 produced at the reel 119 of the paper machine 80. After forming in the forming section 87, the fibrous structure 88 was through-air dried to a consistency of approximately 66% to 74% prior to transfer to the Yankee dryer 109. The web was then dried, creped, calendered and wound into a roll 116 at the reel 119 of the paper machine 80.

Referring to Table I, columns 1 and 2, six different creping aids were evaluated on the paper machine 80. The first creping aid, comprised of 100% polyvinyl alcohol (PVOH) and commercially supplied as AIRVOL 425, was applied to the surface of the Yankee dryer 109 through the creping aid spray boom shower 107 at an application rate of 2.25 pounds of active creping aid per ton of dry weight of the fibrous structure 88 produced at the reel 119 of the paper machine 80. The second creping aid evaluated on the paper machine 80, comprised of 70% AIRVOL 425 and 30% of a non-thermosetting cationic resin containing no secondary amines commercially supplied as CREPETROL A 3025, was applied to the surface of the Yankee dryer 109 through the creping aid spray boom shower 107 at an application rate of 2.25 pounds of active creping aid per ton of dry weight of the fibrous structure 88 produced at the reel 119 of the paper machine 80. The third creping aid evaluated on the paper machine 80, comprised of 60% AIRVOL 425 and 40% CREPETROL A 3025, was applied to the surface of the Yankee dryer 109 through the creping aid spray boom shower 107 at an application rate of 2.25 pounds of active creping aid per ton of dry weight of the fibrous structure 88 produced at the reel 119 of the paper machine 80. The fourth creping aid evaluated on the paper machine 80, comprised of 65% AIRVOL 425 and 35% CREPETROL A 3025, was applied to the surface of the Yankee dryer 109 through the creping aid spray boom shower 107 at an application rate of 2.25 pounds of active creping aid per ton of dry weight of the fibrous structure 88 produced at the reel 119 of the paper machine 80. The fifth creping aid evaluated on the paper machine 80, comprised of 65% AIRVOL 425 and 35% CREPETROL A 3025, was applied to the surface of the Yankee dryer 109 through the creping aid spray boom shower 107 at an application rate of 1.7 pounds of active creping aid per ton of dry weight of the fibrous structure 88 produced at the reel 119 of the paper machine 80. The sixth creping aid evaluated on the paper machine 80, comprised of 59% AIRVOL 425, 33% CREPETROL A 3025 and 8% of a plasticizer commercially supplied as CREPETROL R 6390, was applied to the surface of the Yankee dryer 109 through the creping aid spray boom shower 107 at an application rate of 1.84 pounds of active creping aid per ton of dry weight of the fibrous structure 88 produced at the reel 119 of the paper machine 80. For each of the six creping aids evaluated, the percentage of each creping aid component used was based on the total actives content of each component.

The first three creping aids evaluated represented screening tests conducted in order to study the impact of PVOH and CREPETROL A 3025 on creping blade pickout holes. Creping blade pickout holes, which refers to holes picked out of the fibrous structure 88 by the creping blade 111, are easily recognized by one skilled in the art. No quantitative evaluation of cleaning blade changes could be determined, however, qualitative analysis indicated that as the amount of CREPETROL A 3025 was increased, crepe quality degraded. In the case of creping aids 2 and 3, it was noted that the blend of PVOH and CREPETROL A 3025 increased the rate of coating buildup on the surface of the Yankee dryer 109 thereby increasing the risk of observing creping aid in the fibrous structure 88 at the reel 119 of the paper machine 80. Referring to creping aid 4, a 65% PVOH and 35% CREPETROL A 3025 was chosen for further optimization as it appeared to minimize creping blade pickout holes, extraneous creping aid in the fibrous structure 88, poor crepe quality as measured by the occurrence of skipped crepe in the fibrous structure 88 and any negative effects on the papermaking process resultant from frequent cleaning blade 114 changes.

Referring to columns 3 and 4 of Table I, the average creping blade pickout hole count and a qualitative evaluation of the amount of extraneous creping aid in the fibrous structure 88 was determined for each creping aid evaluated. For this analyses, a roll 116 of the fibrous structure 88 at the reel 119 of the paper machine 80 was used. The samples of the fibrous structure 88 to be measured were divided into two equal sections in the cross machine direction, comprising a front or tending side sample and a back or drive side sample. The two sections each 96 inches in width and approximately 52.5 feet in length were graded separately. Each section was further subdivided in the cross machine direction into four 24 inch sections. Utilizing black foam core board as a base, a grading board with a defined measurement area having the dimensions of 96 inches wide and 21 inches long was used. Each 24 inch section of the two fibrous structure 88 samples was measured.

Each section was evaluated for the presence of creping blade pickout holes. Holes that were 0.125 inches or larger in any dimension were counted and recorded. Each section was also evaluated for the presence of extraneous creping aid in the fibrous structure 88 as evidenced by glue streaks. For each roll 116 of the fibrous structure 88 analyzed, the total number of holes counted for both the tending side sample and the drive side sample were recorded. Additionally, for each roll 116 the total number of sections containing glue streaks was recorded. Based on these totals, an average number for creping blade pickout hole count and extraneous creping aid in the fibrous structure 88 was then calculated based on all the rolls 116 evaluated. Referring to columns 3 and 4 of Table I, "n" refers to the total number of rolls evaluated and the number upon which the figures for the average creping blade pickout hole count and extraneous creping aid in the fibrous sheet 88 was based for each creping aid evaluated. For creping aids 1, 2, and 3, there was no data available for extraneous creping aid in the fibrous sheet 88.

Referring to column 5 of Table I, the number of cleaning blade 114 changes over a 12 hour period was calculated for each creping aid evaluated. No data was available for creping aids 1, 2, and 3.

TABLE I

| Creping Aid | Average Creping Blade Pickout Hole Count | Average Amount of Extraneous Creping Aid in the Fibrous Structure | Cleaning Blade Changes Per 12 Hours |
|---|---|---|---|
| 1. 100% PVOH (2.25 pounds/ton added) | n = 7 Hole Count = 308 | NA | NA |
| 2. 70% PVOH 30% CREPETROL A 3025 (2.25 pounds/ton added) | n = 5 Hole count = 153 | NA | NA |
| 3. 60% PVOH 40% CREPETROL A 3025 (2.25 pounds/ton added) | n = 2 Hole count = 30 | NA | NA |
| 4. 65% PVOH 35% CREPETROL A 3025 (2.25 pounds/ton added) | n = 40 Hole count = 53 | n = 40 Avg. = 55.80 | 8.5 |

TABLE I-continued

| | Creping Aid | Average Creping Blade Pickout Hole Count | Average Amount of Extraneous Creping Aid in the Fibrous Structure | Cleaning Blade Changes Per 12 Hours |
|---|---|---|---|---|
| 5. | 65% PVOH 35% CREPETROL A 3025 (1.7 pounds/ton added) | n = 36 Hole count = 42 | n = 35 Avg. = 37.05 | 8.5 |
| 6. | 59% PVOH 33% CREPETROL A 3025 8% CREPETROL R 6390 (1.84 pounds/ton added) | n = 60 Hole count = 7.2 | n = 60 Avg. = 2.87 | 4.0 |

NOTES:
1. During the evaluations of creping aids 1. 2. 3, 4, and 5, a foraminous carrier fabric having a 31% knuckle area was utilized on the machine and a creping blade was utilized which had a 21 degree bevel angle.
2. During the evaluation of creping aid 6, a foraminous carrier fabric having a 35% knuckle area was utilized on the machine. Creping blades having 21 degree and 26 degree bevel angles were used on this machine during the evaluation of creping aid 6. The effect of bevel angle was determined to be minimal relative to the creping aid formulation.

While particular embodiments of the present invention have been illustrated and described it would be obvious to those skilled in the art that various other changes and modifications can be made without departing from the spirit and scope of the invention. It is therefore intended to cover in the appended claims all such changes and modifications that are within the scope of this invention.

What is claimed is:

1. A creping aid composition, said creping aid composition comprising: from about 30% to 90% of a polyvinyl alcohol having a degree of hydrolysis of about 86% or greater and from about 10% to 70% of a non-thermosetting cationic resin containing no secondary amines, said non-thermosetting cationic resin derived from reacting the polyamides of a dicarboxylic acid and methyl bis(3-aminopropyl) amine in aqueous solution with epichlorohydrin in a mole ratio of between about 1:0.1 and about 1:0.33.

2. The creping aid composition of claim 1, further comprising:
a plasticizer, wherein said plasticizer is selected from the group consisting of ethylene glycol, propylene glycol, diethylene glycol, triethylene glycol, dipropylene glycol and glycerol.

3. The creping aid composition of claim 2 wherein said plasticizer comprises from about 0.5% to 90% of said creping aid composition based on the dry weight of said plasticizer relative to the dry weight of said creping aid composition.

4. The creping aid composition of claim 1 wherein said non-thermosetting cationic resin has a viscosity at 25° C. of about 20 centipoise to 500 centipoise.

5. The creping aid composition of claim 1 wherein said non-thermosetting cationic resin has a total solids content of about 12% to 30% based on the dry weight of said non-thermosetting cationic resin.

6. A creping aid composition, said creping aid composition comprising:
   a) about 5% to 95% of a polyvinyl alcohol,
   b) about 5% to 90% of a non-thermosetting cationic resin containing no secondary amines, said non-thermosetting cationic resin derived from reacting the polyamides of a dicarboxylic acid and methyl bis(3-aminopropyl)amine in aqueous solution with epichlorohydrin in a mole ratio of between about 1:0.1 and about 1:0.33, and
   c) about 0.5% to 90% of a plasticizer.

7. The creping aid composition of claim 6 further comprising:
a plasticizer, wherein said plasticizer is selected from the group consisting of ethylene glycol, propylene glycol, diethylene glycol, triethylene glycol, dipropylene glycol and glycerol.

8. The creping aid composition of claim 6 wherein said polyvinyl alcohol has a degree of hydrolysis of about 86% or greater.

9. The creping aid composition of claim 6 wherein said non-thermosetting cationic resin has a viscosity at 25° C. of about 20 centipoise to 500 centipoise.

10. The creping aid composition of claim 6 wherein said non-thermosetting cationic resin has a total solids content of about 12% to 30% based on the dry weight of said non-thermosetting cationic resin.

* * * * *